Patented Nov. 11, 1947

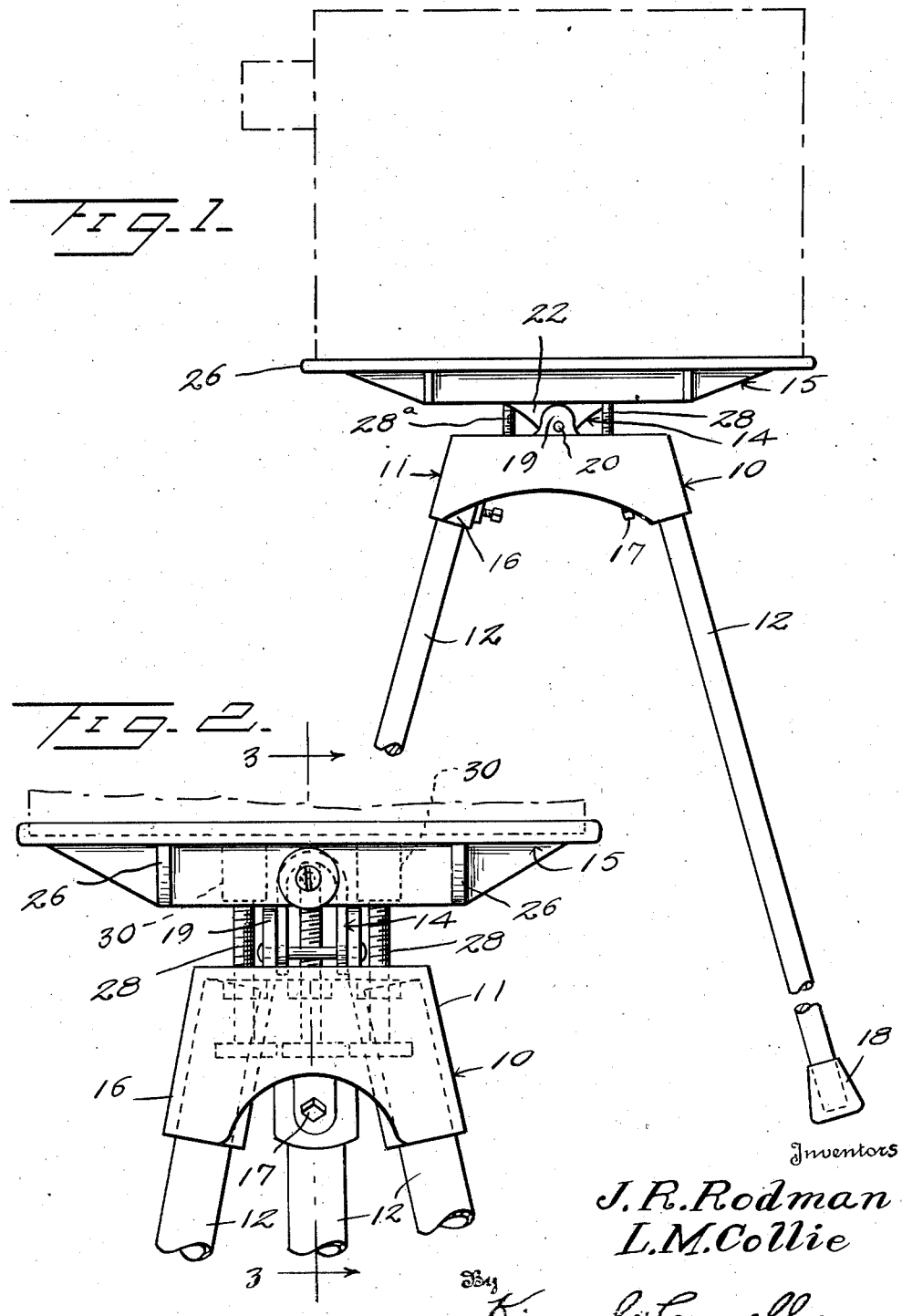

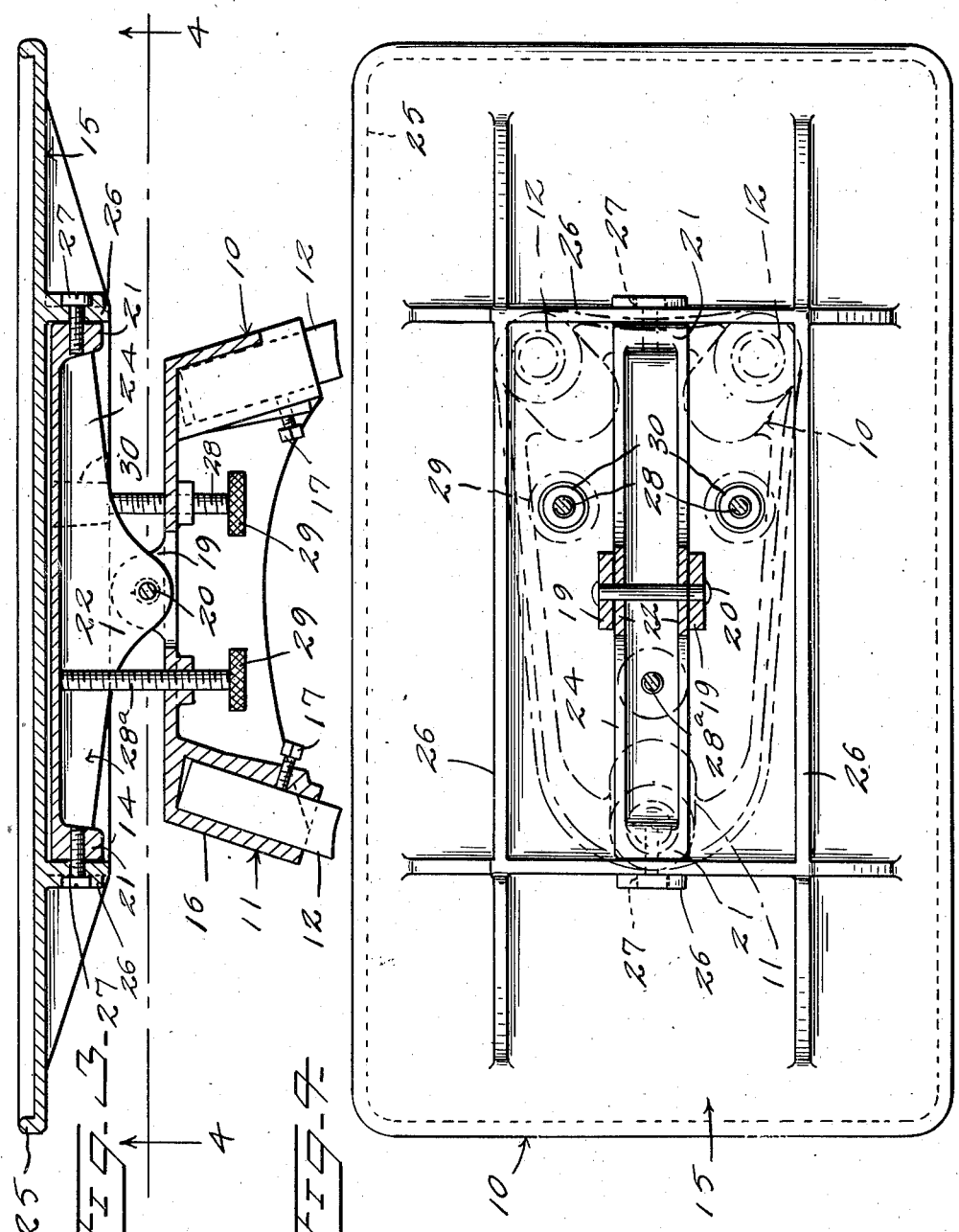

2,430,826

UNITED STATES PATENT OFFICE 2,430,826

MOTION-PICTURE PROJECTOR STAND

John Robert Rodman and Lyman M. Collie, Chattanooga, Tenn.

Application September 3, 1946, Serial No. 694,559

1 Claim. (Cl. 248—127)

This invention relates to supporting stands and more particularly to a stand for supporting a motion picture projector.

It is an object of this invention to provide a stand for a motion picture projector having a tripod base and a flat supporting surface mounted above the base in such a manner that the supporting surface or base plate may be tilted in any and all directions to properly level the projector in operative position thereon.

Another object of this invention is to provide a stand of the kind to be more specifically described hereinafter, having a tripod base, a projector supporting member swivellably mounted above the base for rocking movement to any desired position, and screw stops carried by the base engageable with the bottom of the flat projector supporting member for fixing the member in adjusted position.

Still another object of this invention is to provide a stand for a motion picture projector or the like, having a tripod base and a flat projector supporting member mounted on the base by a universal joint whereby the projector may be rocked to any desired position relative to the base, and means for fixing the supporting member in selected adjusted position.

Still another object of this invention is to provide a stand of this kind having a base and tripod legs slidably engaging in the base whereby the legs may be removed from the base for dismantling the assembled stand, the base having set screws engageable with the legs in their assembled position for locking the legs therein.

With the above and other objects in view, our invention consists in the arrangement, combination and details of construction disclosed in the drawings and specification, and then more particularly pointed out in the appended claim.

In the drawings,

Figure 1 is a side elevation, partly broken away, of our stand,

Figure 2 is a front elevation, partly broken away,

Figure 3 is a vertical section taken on the line 3—3 of Figure 2, and

Figure 4 is a horizontal section taken on the line 4—4 of Figure 3.

Referring to the drawings, the numeral 10 designates generally a motion picture projection stand constructed according to an embodiment of our invention. Heretofore stands of this type have been formed with an upper supporting member fixed relative to the supporting legs, usually of the tripod type, wherein each of the legs was pivotally connected to the base and any adjustment of the head was accomplished by either adjusting the length of the legs or changing the position of one or more legs relative to the other legs and the head or projector supporting member. Such an arrangement, when extensive adjustment was required, resulted in a precariously or flimsily supported projector and in the case of slidable or telescoping legs, there always existed the possibility of one leg slipping out of adjustment. The most desirable condition is to have a stand with fixed legs, both in length and in their relation to the base, and having a head swivellably supported on the base and means for locking the head in a selected position so that the center of weight is over the center of gravity.

By constructing a stand in the manner hereinafter described, this desirable condition is obtained.

The stand 10 comprises a base plate 11 to which are removably attached tripod legs 12, a universal joint 14 carried by the plate 11, and a flat projector supporting head 15 carried by the universal joint 14. The base plate 11 is supported in a horizontal position and is formed in a generally triangular shape having downwardly and outwardly inclined sockets 16 at each corner. The upper ends of the tubular legs 12 are slidably engageable in the sockets 16 and may be locked in position by the set screws 17 carried by the sockets 16 frictionally engaging the legs 12. Soft tips 18, which may be made of rubber or other suitable material, are carried by the lower ends of the legs 12 to hold the stand against slipping.

The base plate 11 is formed with a pair of spaced apart apertured ears 19 on the upper surface thereof at substantially the center of the plate 11, and a pivot pin 20 is carried by the ears 19.

The universal joint 14 is pivotally secured between the ears 19 on the pin 20. The universal joint or coupling member 14 is formed of an elongated inverted U-shaped channel having closed apertured ends 21. Midway the length of the member 14 there is provided a pair of downwardly extending apertured ears 22 which depend from the opposite sides or arms 24 of the member 14 and are engaged by the pin 20 for rocking motion thereon.

The projector supporting member or head 15 is rockably carried by the universal joint 14 for rocking motion by a pivot at right angles to the pivot 20. The head 15 is formed of a flat surface having a peripheral bead or upstanding flange 25 about the upper side thereof to hold the projector from sliding off the stand. On the lower side of the head 15 there is fixed a downwardly extending frame formed of pairs of right angularly related ribs 26, each of which intersects the adjacent ribs intermediate the length thereof. Pivot pins or screws 27 extend through one pair of parallel ribs 26 engaging in the apertured ends 21 of the member 14 at right angles to the pivot pin 20, whereby the head 15 is pivotally secured to the base 11 for universal movement.

To hold the head 15 in a selected pivoted position, there are provided three screws 28 which extend through the base 11, the screws 28 having a knurled finger grip 29 on the lower end thereof. Two screws 28, one on each side of the coupling member 14, engage the lower end of downwardly extending bosses or stops 30 fixed on the lower side of the head 16, and one screw 28a on the opposite side of the pivot 20 from the screws 28 engages the lower side of the member 14, whereby the two screws 28 hold the head 11 against movement about the pivot 27 and the three screws 28 hold the head 11 against movement about the pivot 20.

In the use and operation of the stand 10, the projector rests on the head 11 and may be adjusted to any desired position by rotating the screws 28 and 28a until the projector is adjusted, the screws 28, one on each side of the pivot 27, when turned in opposite directions effect rocking of the head 11 about the pivot 27, and the screw 28a, when turned in a direction opposite from the screws 28, effect movement of the head 11 about the pivot 20.

We do not mean to confine ourselves to the exact details of construction herein disclosed, but claim all variations falling within the purview of the appended claim.

What we claim is:

In a motion picture projector stand comprising a base member, supporting means for said base member, a tiltable head, and a universal connecting means between said base and said head, said base formed with a plurality of apertures therethrough about said connecting means, and adjustable screw threaded means projecting through said apertures for engagement at their upper end with said head for securing said head in selected adjusted tilted position, whereby the base and head may be disposed in close proximity and the screw threaded means may be disposed for access irrespective of the relative tilted position of the head and base.

JOHN ROBERT RODMAN.
LYMAN M. COLLIE.

REFERENCES CITED

The following references are of record in the file of this patent:

UNITED STATES PATENTS

| Number | Name | Date |
|---|---|---|
| 1,112,935 | Rial et al. | Oct. 6, 1914 |
| 1,480,651 | Bailey | Jan. 15, 1924 |
| 1,863,891 | Zuber | June 21, 1932 |